United States Patent
Wang (10) Patent No.: US 10,893,365 B2
(45) Date of Patent: Jan. 12, 2021

(54) METHOD FOR PROCESSING VOICE IN ELECTRONIC DEVICE AND ELECTRONIC DEVICE

(71) Applicant: Guangdong Oppo Mobile Telecommunications Corp., Ltd., Guangdong (CN)

(72) Inventor: Bin Wang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/514,321

(22) Filed: Jul. 17, 2019

(65) Prior Publication Data

US 2020/0029156 A1    Jan. 23, 2020

(30) Foreign Application Priority Data

Jul. 19, 2018  (CN) .......................... 2018 1 0798319

(51) Int. Cl.
| | | |
|---|---|---|
| *G06F 17/00* | (2019.01) | |
| *H04R 5/033* | (2006.01) | |
| *G06F 40/263* | (2020.01) | |
| *H04R 1/10* | (2006.01) | |

(52) U.S. Cl.
CPC ........... *H04R 5/033* (2013.01); *G06F 40/263* (2020.01); *H04R 1/10* (2013.01); *H04R 2420/07* (2013.01)

(58) Field of Classification Search
CPC ...... H04R 5/033; H04R 1/10; H04R 2420/07; G06F 40/263
See application file for complete search history.

(56) References Cited

U.S. PATENT DOCUMENTS

| 9,438,294 | B2 | 9/2016 | Boesen | |
|---|---|---|---|---|
| 10,334,349 | B1* | 6/2019 | Crowder | ............... A61B 5/7225 |
| 2003/0065504 | A1* | 4/2003 | Kraemer | ................. G06F 40/58 |
| | | | | 704/8 |
| 2011/0035219 | A1* | 2/2011 | Kadirkamanathan | ........................ |
| | | | | G10L 15/005 |
| | | | | 704/239 |
| 2013/0144595 | A1* | 6/2013 | Lord | ...................... G06F 17/289 |
| | | | | 704/2 |
| 2013/0289971 | A1* | 10/2013 | Parkinson | ............... G10L 15/26 |
| | | | | 704/2 |

(Continued)

FOREIGN PATENT DOCUMENTS

| CN | 102821259 A | 12/2012 |
|---|---|---|
| CN | 204480109 U | 7/2015 |

(Continued)

OTHER PUBLICATIONS

International search report issued in corresponding international application No. PCT/CN2019/096189 dated Oct. 15, 2019.

(Continued)

*Primary Examiner* — Joseph Saunders, Jr.

(57) ABSTRACT

Provided are a method for processing information and related products. The method includes the following. A target voice corresponding to a target language type is obtained. A first language type corresponding to the first headphone is determined. The target voice is converted into a first input voice corresponding to the first language type. The first input voice is sent to the first headphone.

15 Claims, 6 Drawing Sheets

(56) References Cited

U.S. PATENT DOCUMENTS

2013/0325434 A1    12/2013  Boesen
2014/0358516 A1*   12/2014  Lin ..................... G06F 17/289
                                                              704/2
2019/0058784 A1*   2/2019   Truhill ............... H04M 1/6066
2019/0132895 A1*   5/2019   Lee ..................... H04W 4/80

FOREIGN PATENT DOCUMENTS

| CN | 106156009 A | 11/2016 |
| CN | 106412813 A | 2/2017 |
| CN | 106851450 A | 6/2017 |
| CN | 106919562 A | 7/2017 |
| CN | 107708006 A | 2/2018 |
| CN | 107885732 A | 4/2018 |
| CN | 108280067 A | 7/2018 |

OTHER PUBLICATIONS

Extended European search report issued in corresponding European application No. 19187021.1 dated Nov. 6, 2019.

* cited by examiner

METHOD FOR PROCESSING VOICE IN ELECTRONIC DEVICE AND ELECTRONIC DEVICE

CROSS-REFERENCE TO RELATED APPLICATIONS

This application claims priority to Chinese Patent Application No. 201810798319.1, filed on Jul. 19, 2018, the disclosure of which is hereby incorporated by reference in its entirety.

TECHNICAL FIELD

This disclosure relates to the technical field of electronics, and more particularly to a method for processing information and an electronic device.

BACKGROUND

With the development of wireless technology, a scenario in which wireless headphones are coupled with electronic devices such as mobile phones through wireless technology is becoming increasingly prevalent. Functions such as listening to music, making a call, etc. can be realized with the wireless headphones. However, existing wireless headphones have only simple functions, which provides poor experience for users.

SUMMARY

In a first aspect of the present disclosure, a method for processing information is provided. The method includes the following. A target voice corresponding to a target language type is obtained. A first language type corresponding to the first headphone is determined. The target voice is converted into a first input voice corresponding to the first language type. The first input voice is sent to the first headphone.

In a second aspect of the present disclosure, an electronic device is provided. The electronic device includes a processor, a memory, a communication interface, and one or more programs stored in the memory and configured to be executed by the processor. The one or more programs include instructions operable with the processor to perform all or part of the operations of the first aspect of the present disclosure.

In a third aspect of the present disclosure, a non-transitory computer readable storage medium is provided. The computer readable storage medium is configured to store computer programs for electronic data interchange. The computer programs are operable with a computer to perform all or part of the operations of the first aspect of the present disclosure.

BRIEF DESCRIPTION OF THE DRAWINGS

In order to describe technical solutions of implementations of the present disclosure or the related art more clearly, the following will give a brief description of accompanying drawings used for describing the implementations of the present disclosure or the related art. Apparently, accompanying drawings described below are merely some implementations of the present disclosure. Those of ordinary skill in the art can also obtain other accompanying drawings based on the accompanying drawings described below without creative efforts.

DETAILED DESCRIPTION

In order for those skilled in the art to better understand technical solutions of the present disclosure, technical solutions of implementations of the present disclosure will be described clearly and completely with reference to accompanying drawings in the implementations of the present disclosure. Apparently, implementations described hereinafter are merely some implementations, rather than all implementations, of the present disclosure. All other implementations obtained by those of ordinary skill in the art based on the implementations of the present disclosure without creative efforts shall fall within the protection scope of the present disclosure.

Detailed description will be given below.

The terms "first", "second", "third", "fourth", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or apparatus can also be included.

The term "implementation" referred to herein means that a particular feature, structure, or character described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

An electronic device may include various handheld devices, in-vehicle devices, wireless headphones, computing devices that have wireless communication functions or other processing devices connected to the wireless modem, as well as various forms of user equipment (UE), mobile stations (MS), terminal devices, and the like. For the convenience of description, the above-mentioned devices are collectively referred to as the electronic device.

In implementations of the present disclosure, a wireless headphone may be a Bluetooth headphone, or other headphones based on wireless transmission, such as a photoconduction headphone, etc. The Bluetooth headphone may be an ordinary Bluetooth headphone, that is, the headphone plays sounds through a speaker, or may be a bone-conduction headphone. For the wireless headphone, the manner in which sound is conducted is not limited in the present disclosure. The wireless headphone can establish a wireless connection with the electronic device.

In an example, the wireless headphone can be ear hook headphones, earbuds, or over-ear/on-ear headphones, which is not limited herein.

The wireless headphone can include a headphone housing, a rechargeable battery (such as a lithium battery) accommodated in the headphone housing, multiple metal contacts for coupling the rechargeable battery with a charging device, and a speaker assembly including a driver unit and a directional voice port. The driver unit includes a magnetic body, a voice coil, and an isolation membrane. The driver unit is configured to make a sound from the directional voice port. The multiple metal contacts are arranged on an outer surface of the headphone housing.

Hereinafter, implementations of the present disclosure will be described in detail.

Figure 1A:
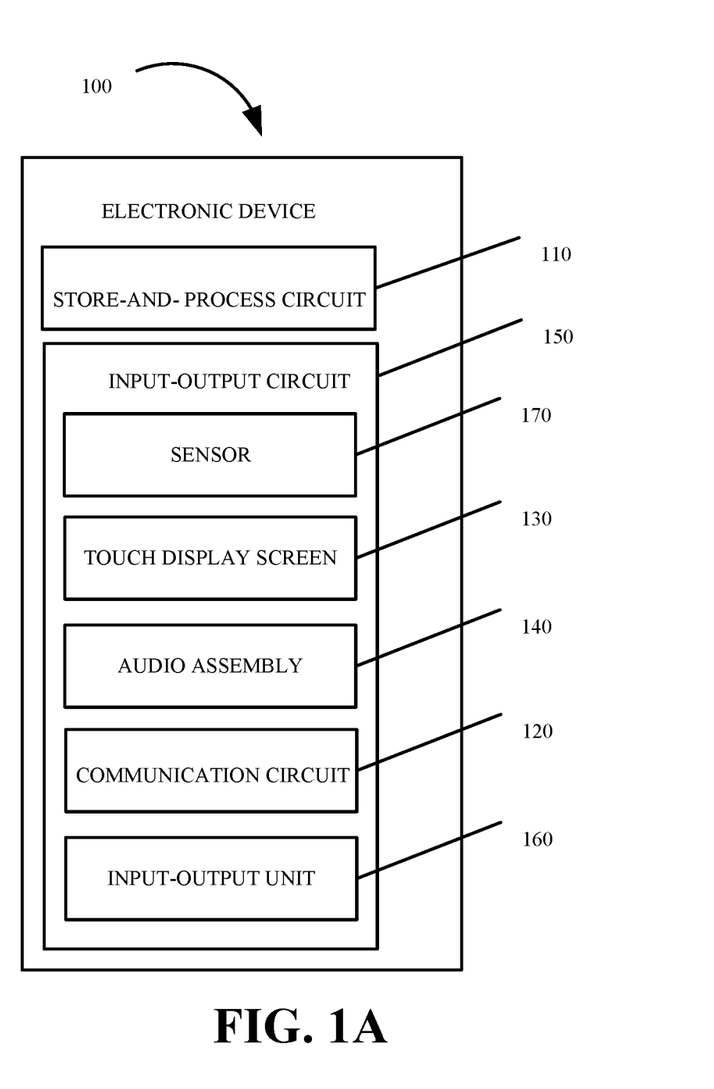
FIG. 1A is a schematic structural diagram illustrating an electronic device according to an implementation of the present disclosure.

FIG. 1A is a schematic structural diagram illustrating an electronic device according to an implementation of the present disclosure. As illustrated in FIG. 1A, the electronic device 100 can include a control circuit. The control circuit can include a store-and-process circuit 110. The store-and-process circuit 110 has a memory, such as a hard drive memory, a non-transitory memory (such as a flash memory, other electronically programmable read-only memories used to form a solid-state drive, or the like), a transitory memory (such as a static random access memory, dynamic random access memory, or the like), or the like, which is not limited herein. The store-and-process circuit 110 has a processing circuit to control operations of the electronic device 100. The processing circuit can be implemented based on one or more microprocessors, microcontrollers, digital controllers for switching between master and slave headphones, baseband processors, power management units, audio codec chips, application-specific integrated circuits, display driver integrated circuits, or the like.

The store-and-process circuit 110 can be configured to run software of the electronic device 100, such as an Internet browsing application, a voice over Internet protocol (VOIP) phone call application, an email application, a media playback application, an operating system function, and the like. The software may be used to perform some control operations, such as camera-based image collection, ambient light sensor-based ambient light measurements, proximity sensor-based proximity state measurements, information display function based on status indicators such as status indicator lamps of light-emitting diodes (LEDs), touch sensor-based touch event detection, functions associated with displaying information on multiple (e.g., layered) displays, operations associated with implementing wireless communication functions, operations associated with collecting and generating audio signals, control operations associated with collecting and processing button-press event data, and other functions of the electronic device 100, which is not limited herein.

The electronic device 100 can further include an input-output circuit 150. The input-output circuit 150 can be configured to achieve data input and data output of the electronic device 100, that is, to allow the electronic device 100 to receive data from an external device and also allow the electronic device 100 to output data to an external device. The input-output circuit 150 can include a sensor 170. The sensor 170 may include an ambient light sensor, an optical or capacitive proximity sensor, a touch sensor (e.g., based on an optical touch sensor and/or a capacitive touch sensor, where the touch sensor may be a part of a touch display screen or may be used independently as a touch sensor structure), an acceleration sensor, a gravity sensor, and other sensors.

The input-output circuit 150 can further include one or more display devices, such as a display 130. The display 130 may include one or more of a liquid crystal display, an organic light emitting diode (OLED) display, an electronic ink display, a plasma display, displays based on other display technologies. As an example, the display 130 includes an array of touch sensors (i.e., the display 130 can be a touch display screen). The touch sensor may be a capacitive touch sensor formed by an array of transparent touch sensor electrodes (e.g., indium tin oxide (ITO) electrodes), or may be a touch sensor formed with other touch technologies, such as acoustic touch, pressure sensitive touch, resistance touch, optical touch, and the like, and implementations of the present disclosure are not particularly restricted.

An audio assembly 140 is configured to provide the electronic device 100 with audio input and output functions. The audio assembly 140 of the electronic device 100 may include speakers, microphones, buzzers, tone generators, and other assemblies for generating and detecting sound.

A communication circuit 120 is configured to provide the electronic device 100 with the ability to communicate with external devices. As an example, the communication circuit 120 includes analog/digital input-output interface circuits and wireless communication circuits based on radio frequency signals and/or optical signals. The wireless communication circuit of the communication circuit 120 may include a radio frequency transceiver circuit, a power amplifier circuit, a low-noise amplifier, a switch, a filter, and an antenna. As an example, the wireless communication circuit of the communication circuit 120 includes a circuit for supporting near field communication (NFC) by transmitting and receiving near field coupled electromagnetic signals. Specifically, the communication circuit 120 includes an NFC antenna and an NFC transceiver. As another example, the communication circuit 120 further includes transceivers and antennas for cellular telephone, transceiver circuits and antennas for wireless local area network, and the like.

The electronic device 100 can further include a battery, a power management circuit, and other input-output units 160. The other input-output units 160 include but are not limited to buttons, joysticks, click wheels, scroll wheels, touch pads, keypads, keyboards, cameras, LEDs, and other status indicators.

An instruction can be input by a user via the input-output circuit 150 to control operations of the electronic device 100, and state information and other outputs can be received from the electronic device 100 with the input-output circuit 150 outputting data.

Figure 1B:
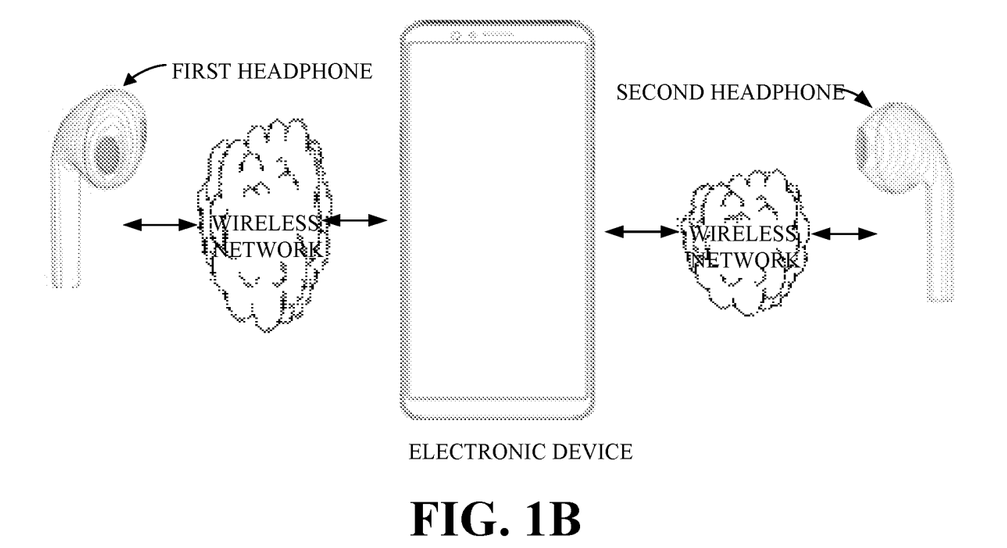
FIG. 1B is a schematic diagram illustrating a system network architecture for performing a method for processing information according to an implementation of the present disclosure.

FIG. 1B is a schematic diagram illustrating a system network architecture for performing a method for processing information according to an implementation of the present disclosure. The system includes a first headphone and a second headphone of a wireless headphone, and an electronic device. Both the first headphone and the second headphone communicate with the electronic device via a wireless network. The wireless network can be Bluetooth, infrared, etc. A first communication link is established between the first headphone and the electronic device via a wireless network, and the wireless network can be Wi-Fi, Bluetooth, visible light communication, invisible light communication (infrared communication and ultraviolet communication), or the like. Based on the first communication link, data transmission (such as voice data, image data, video data, etc.) can be conducted between the first headphone and the electronic device. A second communication link is established between the second headphone and the electronic device via a wireless network. Based on the second communication link, data transmission (such as voice data, image data, video data, etc.) can be conducted between the second headphone and the electronic device.

Figure 1C:
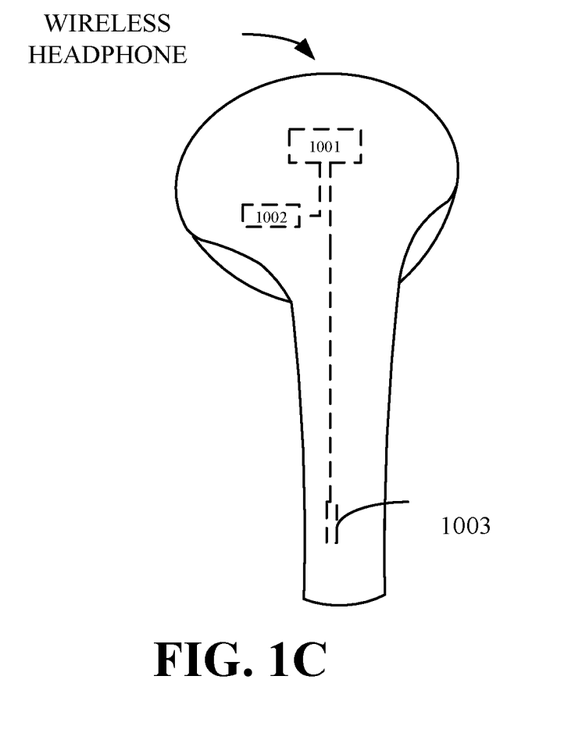
FIG. 1C is a schematic structural diagram illustrating a wireless headphone according to an implementation of the present disclosure.

Corresponding to FIG. 1B, FIG. 1C is a schematic structural diagram illustrating a wireless headphone according to an implementation of the present disclosure. The wireless headphone includes a first headphone and a second headphone (only one of the first headphone and the second headphone is illustrated in FIG. 1C), and these two headphones respectively correspond to the left ear and the right ear of the user. The two headphones can be used separately or in pairs. As illustrated in FIG. 1C, the wireless headphone includes a transceiver 1001, a touch sensor 1002, and a microphone 1003. The touch sensor 1002 and the microphone 1003 are respectively coupled with the transceiver 1001.

Figure 1D:
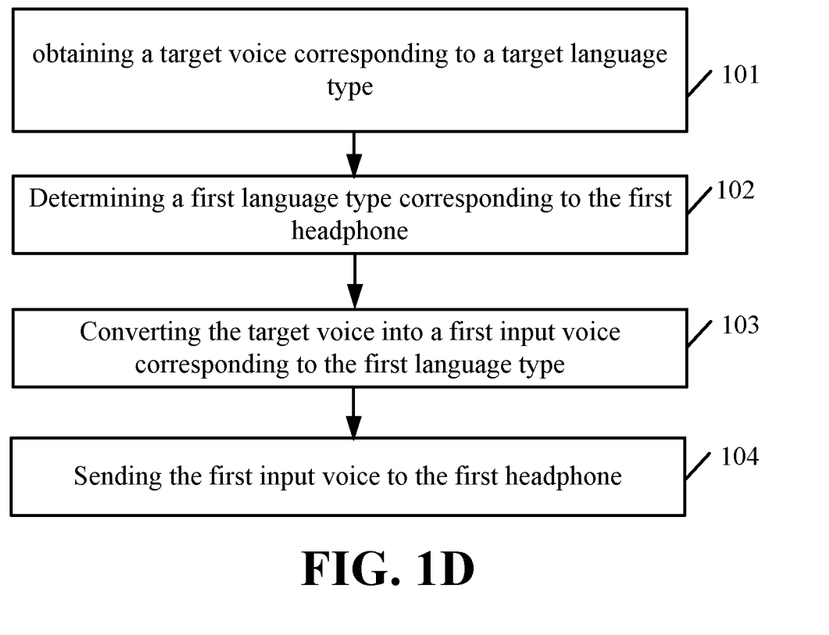
FIG. 1D is a schematic flowchart illustrating a method for processing information according to an implementation of the present disclosure.

Corresponding to FIG. 1C, FIG. 1D is a schematic flowchart illustrating a method for processing information according to an implementation of the present disclosure. The method illustrated in FIG. 1D is applicable to the electronic device illustrated in FIG. 1A and the system illustrated in FIG. 1B. As illustrated in FIG. 1D, the method starts with the operation at 101.

At 101, a target voice is obtained. The target voice corresponds to a target language type.

As an implementation, before the target voice is obtained, a first communication link with a first headphone is established.

As an implementation, before the target voice is obtained, a second communication link with a second headphone is established.

In implementations of the present disclosure, when a video playback instruction is triggered by a user, or when a chat application of the electronic device receives a voice message, or when the electronic device is in a voice call state, the first communication link with the first headphone and the second communication link with the second headphone are established. In this way, a first user and a second user can receive and hear the target voice through the first headphone and the second headphone respectively. The target voice may be a voice to be played by an application of the electronic device, such as a voice in a video file to be played in a video application. The target voice may also be a voice sent by a terminal device to the electronic device, such as a voice message sent to the electronic device by a friend of a user through a chat application of the terminal device when the user is chatting with the friend through the electronic device.

At 102, a first language type corresponding to the first headphone is determined.

In implementations of the present disclosure, the first language type is a language type that the first user wearing the first headphone can understand. Considering that the first user may not understand the target language type corresponding to the target voice, it is necessary to determine the first language type.

As an implementation, the first language type corresponding to the first headphone is determined at 102 as follows. A first instruction for setting language type is received from a user. The first language type corresponding to the first headphone is determined according to the first instruction.

In implementations of the present disclosure, the first language type corresponding to the first headphone is set by the user through the electronic device. Multiple options on language types can be set in the electronic device for the user to select, so that the first user and the second user can select language types corresponding to the above two headphones respectively by themselves.

In an example, in implementations of the present disclosure, the first headphone and the second headphone further include a touch area, which may be located on an outer surface of a headphone housing. The touch area is provided with at least one touch sensor to detect a touch operation. The touch sensor may include a capacitive sensor. When the touch area is touched, at least one capacitive sensor will recognize the touch operation by detecting a change in its own capacitance. Accordingly, the first instruction for setting language type corresponding to a language type is determined according to the touch operation, and is sent to the electronic device through the first communication link. The electronic device determines a corresponding language type according to the first instruction.

As an implementation, the first language type corresponding to the first headphone is determined at 102 as follows. A first output voice is received from the first headphone, where the first output voice is obtained by a microphone of the first headphone. The first language type is determined according to the first output voice.

When the first user wears the first headphone and the second user wears the second headphone, the first output voice of the first user can be obtained by the microphone of the first headphone, and the first language type is determined according to the first output voice. As such, since the first user can understand the first language type, a language type received and heard by the first user is the same as a language type spoken by the first user.

As an implementation, the first language type is determined according to the first output voice as follows. A reference voice is obtained by preprocessing the first output voice. A target voice feature is obtained by performing feature extraction on the reference voice. The first language type corresponding to the target voice feature is determined by processing the target voice feature with a predetermined language-type training model. The language-type training model is configured to obtain a probability that the target voice feature belongs to the first language type by computing the target voice feature. The probability is used for determining whether the target voice feature belongs to the first language type.

"Preprocessing" referred to herein may include at least one of: filtering, signal amplification, signal separation, and the like. The foregoing preprocessing may include filtering on a target voice signal to filter out noise other than human voice. The filtering may include at least one of: linear filtering, wavelet transform, median filtering, etc. The feature extraction mentioned above may include a spectral envelope method, a cepstrum method, a linear predictive coding interpolation method (LPC) method (for example, interpolation method, root finding method), Hilbert transform method, etc., which will not be further described herein.

In implementations of the present disclosure, the target voice feature is obtained by performing the feature extraction on the reference voice, and then the target voice feature is input into the predetermined language-type training model. Multiple voice feature samples can be acquired in advance. The multiple voice feature samples are trained by a deep neural net (DNN) model-hidden markov model (HMM) to obtain the language-type training model. The language-type training model is used to calculate a probability that the first output voice belongs to the first language type, so that the first output voice is determined to belong to the first language type.

At 103, the target voice is converted (in other words, translated) into a first input voice corresponding to the first language type.

In implementations of the present disclosure, when the target language type corresponding to the target voice is different from the first language type required by the first user, the target voice is converted into the first input voice corresponding to the first language type. For example, in a voice call scenario, the target voice is sent by the terminal device, and the first user and the second user respectively wear the first headphone and the second headphone. When the first language type required by the first user is different from the target language type corresponding to the target voice, for example, the target language type corresponding to the target voice is English and the first language type required by the first user is Mandarin, the target voice can be converted into Mandarin. For another example, in a video watching scenario, the language type corresponding to the dialogue of the video is French and the first language type required by the first user is English, and the target voice in French can be converted into the first input voice in English.

At 104, the first input voice is sent to the first headphone.

When the target voice is converted into the first input voice, the first input voice can be sent to the first headphone through the first communication link, so that the first user can receive and understand the first input voice.

As an implementation, the method further includes the following. A second input voice corresponding to the second headphone is determined. The second input voice is sent to the second headphone.

In implementations of the present disclosure, the second input voice is the voice heard by the second user through the second headphone. Considering that the second user may be or may not be able to understand the target language type corresponding to the target voice, the second input voice may be a target voice that hasn't undergone conversion yet, or may be a voice obtained by converting from the target voice.

As an implementation, the second input voice corresponding to the second headphone is determined as follows. A second language type corresponding to the second headphone is determined. When the second language type is the same as the target language type, the target voice is determined as the second input voice. When the second language type is different from the target language type, the target voice is converted into the second input voice corresponding to the second language type.

For details of the operation of determining the second language type corresponding to the second headphone, reference can be made to the operations of determining the first language type corresponding to the first headphone.

In an example, the electronic device receives a second instruction for setting language type from a user, and the second language type corresponding to the second headphone is determined according to the second instruction. In another example, the electronic device receives a second output voice from the second headphone which is obtained by a microphone of the second headphone, and the second language type is determined according to the second output voice.

After the second input voice corresponding to the second headphone is determined, the second input voice can be sent to the second headphone through the second communication link.

In implementations of the present disclosure, when the first user is unable to understand the target language type corresponding to the target voice whereas the second user is able to understand the target language type corresponding to the target voice, the target voice can be converted into the first input voice corresponding to the first language type which the first user is able to understand, and the first input voice is sent to the first headphone; for the second user, the target voice can be directly sent to the second headphone as the second input voice. When neither the first user nor the second user is able to understand the target language type corresponding to the target voice, the target voice can be converted into the first input voice corresponding to the first language type that the first user is able to understand, and be converted into the second input voice corresponding to the second language type that the second user is able to understand. As such, whether to convert the target voice can be determined according to different language requirements of the first user and the second user, thereby satisfying personalized requirements of the first user and the second user respectively.

According to the method for processing information described provided herein, the target voice corresponding to the target language type is obtained. The first language type corresponding to the first headphone is determined. The target voice is converted into the first input voice corresponding to the first language type. The first input voice is sent to the first headphone. In this way, the electronic device can control a wireless headphone to achieve multi-language-type input and output, which diversifies the functions of the wireless headphone.

Figure 2:
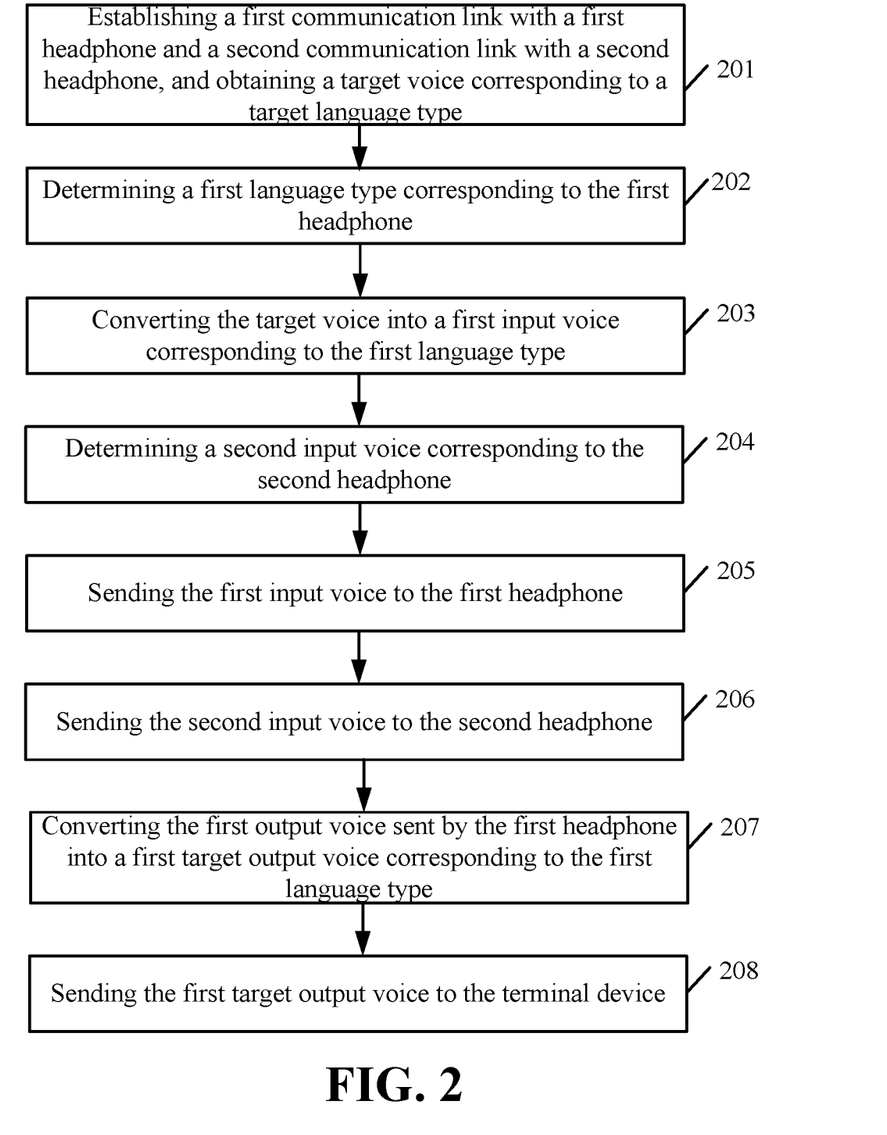
FIG. 2 is a schematic flowchart illustrating a method for processing information according to another implementation of the present disclosure.

FIG. 2 is a schematic flowchart illustrating a method for processing information according to another implementation of the present disclosure. The method illustrated in FIG. 2 is applicable to the electronic device illustrated in FIG. 1A and the system illustrated in FIG. 1B. As illustrated in FIG. 2, the method starts with the operation at 201.

At 201, after a first communication link with a first headphone and a second communication link with a second headphone are established, a target voice is obtained. The target voice corresponds to a target language type.

At 202, a first language type corresponding to the first headphone is determined.

At 203, the target voice is converted into a first input voice corresponding to the first language type.

At 204, a second input voice corresponding to the second headphone is determined.

At 205, the first input voice is sent to the first headphone.

At 206, the second input voice is sent to the second headphone.

For details of the operations at 201 to 206, reference can be made to related descriptions of the method illustrated in FIG. 1D, which will not be repeated herein.

At 207, the first output voice received from the first headphone is converted into a first target output voice corresponding to the target language type.

In implementations of the present disclosure, the target voice is sent by a terminal device, for example, the terminal device initiates a voice call or a video call with the electronic device, or the terminal device sends a voice message to the electronic device through a chat application, etc. Considering that a target friend (a user of the terminal device) may not be able to understand the first output voice sent by the first user, the first output voice can be converted into the first target output voice of the target language type corresponding to the target voice, so that the first user's friend (that is, the target friend or a user of the terminal device) can understand the first target output voice. The target friend is somebody who makes a call with the first user and the second user.

At 208, the first target output voice is sent to the terminal device.

In an example, after receiving a second output voice sent from the second headphone, the electronic device may convert the second output voice into a second target output voice corresponding to the target language type, so that the target friend can understand the first target output voice. As such, voices of the two different language types can be converted into the first target output voice and the second target output voice which are the same as the target voice in language type. For example, when the language used by the first user is Mandarin, the language used by the second user is Shanghai dialect, and the target language type corresponding to the target voice is English, the first output voice and the second output voice can be respectively converted into the first target output voice in English and the second target output voice in English.

According to the method for processing information provided herein, after the first communication link with the first headphone and the second communication link with the second headphone are established, the target voice corresponding to the target language type is obtained. The first language type corresponding to the first headphone is determined. The target voice is converted into the first input voice corresponding to the first language type. The second input voice corresponding to the second headphone is determined. The first input voice is sent to the first headphone. The second input voice is sent to the second headphone. The first output voice received from the first headphone is converted into the first target output voice corresponding to the target language type, and the first target output voice is sent to the terminal device. In this way, the electronic device can control a wireless headphone to achieve multi-language-type input and output, thereby diversifying the functions of the wireless headphone.

Figure 3:
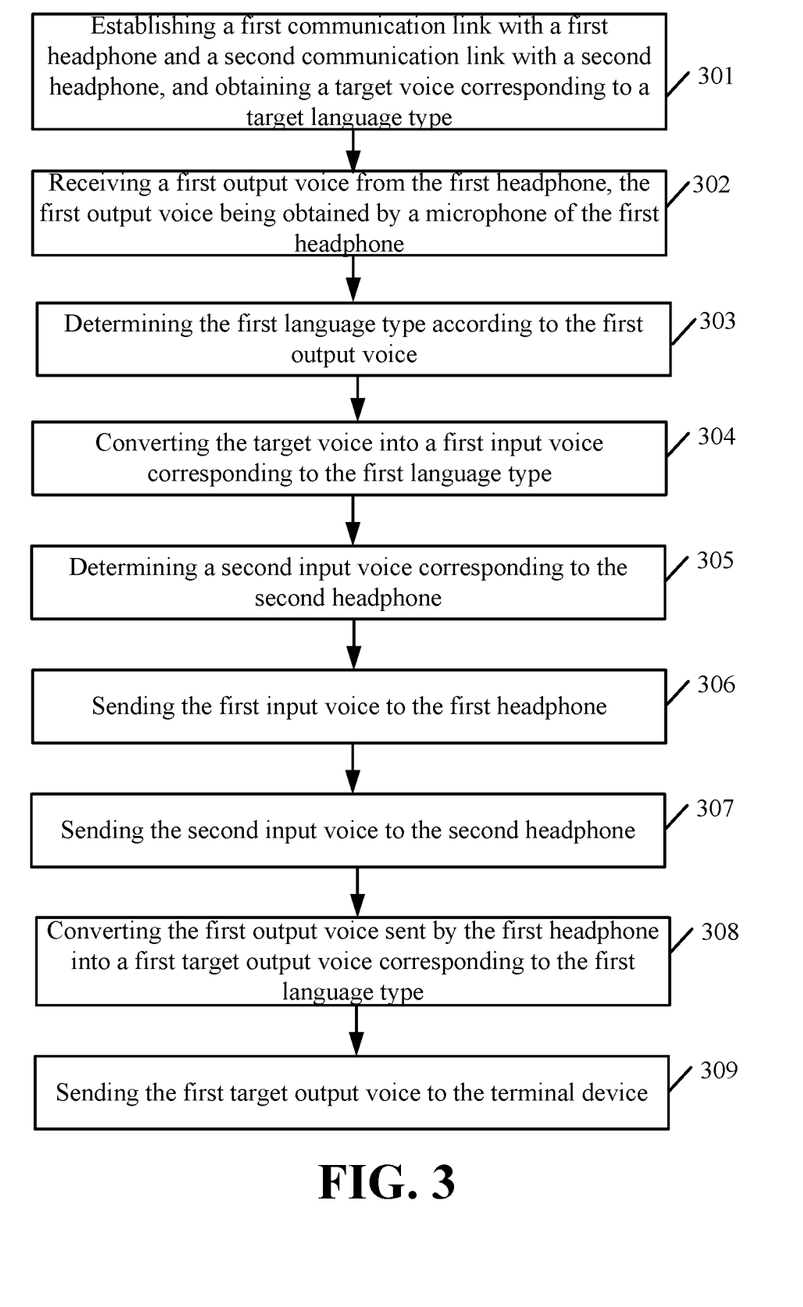
FIG. 3 is a schematic flowchart illustrating a method for processing information according to another implementation of the present disclosure.

FIG. 3 is a schematic flowchart illustrating a method for processing information according to another implementation of the present disclosure. The method illustrated in FIG. 3 is applicable to the electronic device illustrated in FIG. 1A and the system illustrated in FIG. 1B. As illustrated in FIG. 3, the method starts with the operation at 301.

At 301, after a first communication link with a first headphone and a second communication link with a second headphone are established, a target voice is obtained. The target voice corresponds to a target language type.

At 302, a first output voice is received from the first headphone. The first output voice is obtained by a microphone of the first headphone.

At 303, a first language type is determined according to the first output voice.

At 304, the target voice is converted into a first input voice corresponding to the first language type.

At 305, a second input voice corresponding to the second headphone is determined.

At 306, the first input voice is sent to the first headphone.

At 307, the second input voice is sent to the second headphone.

At 308, the first output voice is converted into a first target output voice corresponding to the target language type.

At 309, the first target output voice is sent to the terminal device.

For details of the operations at 301 to 307, reference can be made to related descriptions of the method illustrated in FIG. 1D, and for details of the operations at 308 and 309, reference can be made to related descriptions illustrated in FIG. 2, which will not be described in detail herein again.

According to the method for processing information described in implementations of the present disclosure, after the first communication link with the first headphone and the second communication link with the second headphone are established, the target voice corresponding to the target language type is obtained. The first output voice is received from the first headphone, where the first output voice is obtained by the microphone of the first headphone. The first language type is determined according to the first output voice. The target voice is converted into the first input voice corresponding to the first language type. The second input voice corresponding to the second headphone is determined. The first input voice is sent to the first headphone. The second input voice is sent to the second headphone. The first output voice received from the first headphone is converted into the first target output voice corresponding to the target language type, and the first target output voice is sent to the terminal device. In this way, the electronic device can control a wireless headphone to achieve multi-language-type input and output, which is possible to diversify the function of the wireless headphone.

Figure 4:
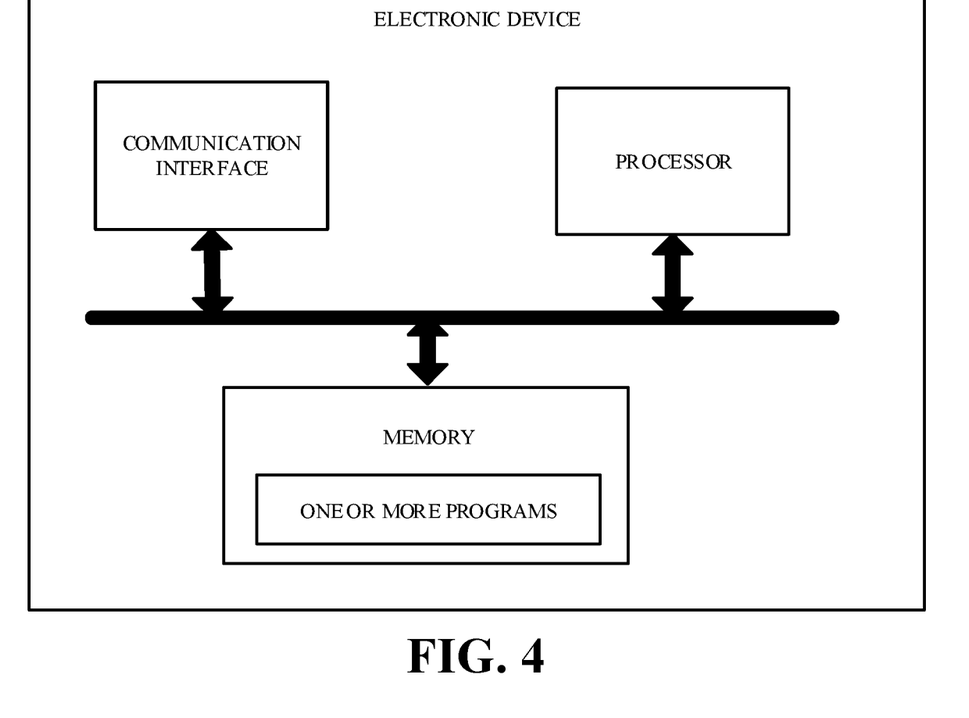
FIG. 4 is a schematic structural diagram illustrating an electronic device according to another implementation of the present disclosure.

FIG. 4 is a schematic structural diagram illustrating an electronic device according to another implementation of the present disclosure. As illustrated in FIG. 4, the electronic device includes a processor, a memory, a communication interface, and one or more programs stored in the memory and configured to be executed by the processor. The one or more programs include instructions operable with the processor to: establish a first communication link with a first headphone and a second communication link with a second headphone, and obtain a target voice corresponding to a target language type; determine a first language type corresponding to the first headphone; convert the target voice into a first input voice corresponding to the first language type; determine a second input voice corresponding to the second headphone; send the first input voice to the first headphone; send the second input voice to the second headphone.

As an example, in terms of determining the first language type corresponding to the first headphone, the one or more programs include instructions operable with the processor to: receive a first instruction for setting language type from a user; determine the first language type corresponding to the first headphone according to the first instruction.

As an example, in terms of determining the first language type corresponding to the first headphone, the one or more programs include instructions operable with the processor to: receive a first output voice from the first headphone; determine the first language type according to the first output voice, where first output voice is obtained by a microphone of the first headphone.

As an example, in terms of determining the first language type according to the first output voice, the one or more programs include instructions operable with the processor to: obtain a reference voice by preprocessing the first output voice; obtain a target voice feature by performing feature extraction on the reference voice; obtain the first language type corresponding to the target voice feature by processing the target voice feature with a predetermined language-type training model. The language-type training model is configured to obtain a probability that the target voice feature belongs to the first language type by computing the target voice feature. The probability is used for determining whether the target voice feature belongs to the first language type.

As an example, the target voice is sent by a terminal device. The one or more programs further include instructions operable with the processor to: convert the first output voice into a first target output voice corresponding to the target language type; send the first target output voice to the terminal device.

As an example, in terms of determining the second input voice corresponding to the second headphone, the one or more programs include instructions operable with the processor to: determine a second language type corresponding to the second headphone; determine the target voice as the second input voice when the second language type is the same as the target language type; convert the target voice into the second input voice corresponding to the second language type when the second language type is different from the target language type.

It can be understood that, in order to implement the above functions, the electronic device includes hardware structures and/or software modules for performing respective functions. Those of ordinary skill in the art will appreciate that units and algorithmic operations of various examples described in connection with implementations herein can be implemented in hardware or a combination of hardware and computer software. Whether these functions are implemented by means of hardware or computer software driving hardware depends on the particular application and the design constraints of the associated technical solution. For a specific application, those skilled in the art may use different methods to implement the described functionality, but such implementation should not be regarded as beyond the scope of the disclosure.

In implementations of the present disclosure, the electronic device can be divided into different functional units according to the above method implementations. For example, the electronic device can be divided into different functional units corresponding to each function, or two or more functions may be integrated into one processing unit. The integrated unit can take the form of hardware or a software functional unit. It is to be noted that, division of units provided herein is illustrative and is just a logical function division. In practice, there can be other manners of division.

Figure 5:
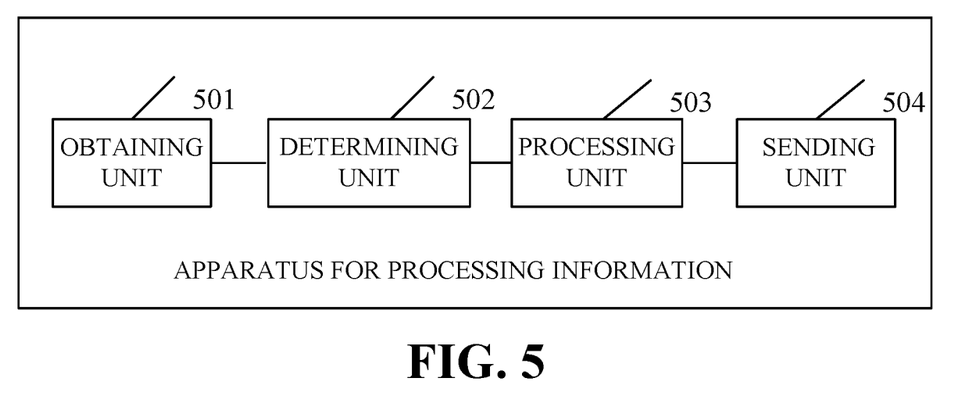
FIG. 5 is a schematic structural diagram illustrating an apparatus for processing information according to an implementation of the present disclosure.

FIG. 5 is a schematic structural diagram illustrating an apparatus for processing information according to an implementation of the present disclosure. The apparatus is applicable to an electronic device. The apparatus includes an obtaining unit 501, a determining unit 502, a processing unit 503, and a sending unit 504.

The obtaining unit 501 is configured to obtain a target voice corresponding to a target language type, after a first communication link with a first headphone and a second communication link with a second headphone are established. The determining unit 502 is configured to determine a first language type corresponding to the first headphone. The processing unit 503 is configured to convert the target voice into a first input voice corresponding to the first language type. The determining unit 502 is further configured to determine a second input voice corresponding to the second headphone. The sending unit 504 is configured to send the first input voice to the first headphone. The sending unit 504 is further configured to send the second input voice to the second headphone.

As an implementation, in terms of determining the first language type corresponding to the first headphone, the determining unit 502 is configured to: receive a first instruction for setting language type from a user, and determine the first language type corresponding to the first headphone according to the first instruction.

As an example, in terms of determining the first language type corresponding to the first headphone, the determining unit 502 is configured to: receive a first output voice from the first headphone, and determine the first language type according to the first output voice. The first output voice is obtained by a microphone of the first headphone As an example, in terms of determining the first language type according to the first output voice, the determining unit 502 is configured to: obtain a reference voice by preprocessing the first output voice; obtain a target voice feature by performing feature extraction on the reference voice; obtain the first language type corresponding to the target voice feature by processing the target voice feature with a predetermined language-type training model. The language-type training model is configured to obtain a probability that the target voice feature belongs to the first language type by computing the target voice feature. The probability is used for determining whether the target voice feature belongs to the first language type.

As an example, the target voice is sent by a terminal device. The processing unit 503 is further configured to convert the first output voice into a first target output voice corresponding to the target language type. The sending unit 504 is further configured to send the first target output voice to the terminal device.

As an example, in terms of determining the second input voice corresponding to the second headphone, the determining unit 502 is configured to: determine a second language type corresponding to the second headphone; determine the target voice as the second input voice when the second language type is the same as the target language type; convert the target voice into the second input voice corresponding to the second language type when the second language type is different from the target language type.

With aid of the apparatus for processing information and related products described in implementations of the present disclosure, after the first communication link with the first headphone and the second communication link with the second headphone are established, the target voice corresponding to the target language type is obtained. The first output voice is received from the first headphone, where the first output voice is obtained by the microphone of the first headphone. The first language type is determined according to the first output voice. The target voice is converted into the first input voice corresponding to the first language type. The second input voice corresponding to the second headphone is determined. The first input voice is sent to the first headphone. The second input voice is sent to the second headphone. The first output voice received from the first headphone is converted into the first target output voice corresponding to the target language type, and the first target output voice is sent to the terminal device. As such, the electronic device can control a wireless headphone to achieve multi-language-type input and output, thereby diversifying the functions of the wireless headphone.

In implementations of the present disclosure, the units can refer an application-specific integrated circuit (ASIC), a processor, a memory configured to implement one or more software or hardware programs, a integrated logical circuit, and/or other devices that can provide above functions. In addition, the above units can be implemented via the processor of terminal device illustrated in FIG. 4.

According to implementations of the disclosure, a computer storage medium is further provided. The computer storage medium is configured to store computer programs for electronic data interchange. The computer programs are operable with a computer to perform all or part of the operations of any of the methods described in the foregoing method implementations. "Computer" referred to herein includes a wearable device.

According to implementations of the present disclosure, a computer program product is further provided. The computer program product includes a non-transitory computer readable storage medium configured to store computer programs. The computer programs are operable with a computer to perform all or part of the operations of any of the methods described in the foregoing method implementations. The computer program product may be a software installation package. The computer includes a wearable device.

It is to be noted that, for the sake of simplicity, the foregoing method implementations are described as a series of action combinations. However, it will be appreciated by those skilled in the art that the present disclosure is not limited by the sequence of actions described. The reason is that, according to the present disclosure, certain steps or operations may be executed in other orders or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or assemblies may be combined or may be integrated into another system, or some features may be ignored or not performed. In addition, coupling or communication connection between each illustrated or discussed component may be direct coupling or communication connection, or may be indirect coupling or communication among devices or units via some interfaces, and may be electrical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to perform all or part of the steps described in the various implementations of the present disclosure. The memory includes various medium capable of storing program codes, such as a universal serial bus (USB) flash disk, a read-only memory (ROM), a random-access memory (RAM), a removable hard disk, a magnetic disk, a compact disc (CD), or the like.

It will be understood by those of ordinary skill in the art that all or part of the steps of the various methods of the implementations described above may be accomplished by means of a program to instruct associated hardware, and the program may be stored in a computer-readable memory, which may include a flash memory, a ROM, a RAM, a magnetic disk, or a CD, and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for processing voice, comprising:
   obtaining, by an electronic device connected with a wireless headphone which comprises a first headphone and a second headphone, a target voice corresponding to a target language type, the target voice being a voice to be played by a video application of the electronic device or a voice sent by a terminal device to the electronic device, the wireless headphone and the electronic device being in a system;
   determining, by the electronic device, a first language type corresponding to the first headphone;
   converting, by the electronic device, the target voice into a first input voice corresponding to the first language type;
   sending, by the electronic device, the first input voice to the first headphones;
   determining, by the electronic device, a second language type corresponding to the second headphone;
   determining, by the electronic device, the target voice as a second input voice when the second language type is the same as the target language type;
   converting, by the electronic device, the target voice into the second input voice corresponding to the second language type when the second language type is different from the target language type; and
   sending, by the electronic device, the second input voice to the second headphone.

2. The method of claim 1, further comprising:
establishing a first communication link with the first headphone.

3. The method of claim 1, wherein determining the first language type corresponding to the first headphone comprises:
receiving a first instruction for setting language type from a user; and
determining the first language type corresponding to the first headphone according to the first instruction.

4. The method of claim 1, wherein determining the first language type corresponding to the first headphone comprises:
receiving a first output voice from the first headphone, the first output voice being obtained by a microphone of the first headphone; and
determining the first language type according to the first output voice.

5. The method of claim 4, wherein determining the first language type according to the first output voice comprises:
obtaining a reference voice by preprocessing the first output voice;
obtaining a target voice feature by performing feature extraction on the reference voice; and
determining the first language type corresponding to the target voice feature by processing the target voice feature with a predetermined language-type training model, the language-type training model being configured to obtain a probability that the target voice feature belongs to the first language type by computing the target voice feature, and the probability being used for determining whether the target voice feature belongs to the first language type.

6. The method of claim 4, wherein the target voice is sent by a terminal device, and the method further comprises:
converting the first output voice into a first target output voice corresponding to the target language type; and
sending the first target output voice to the terminal device.

7. The method of claim 1, further comprising:
establishing a second communication link with the second headphone.

8. An electronic device, connected with a wireless headphone which comprises a first headphone and a second headphone, the wireless headphone and the electronic device being in a system, the electronic device comprising a processor, a memory, a communication interface, and one or more programs stored in the memory and configured to be executed by the processor, and the one or more programs comprising instructions operable with the processor to:
obtain a target voice corresponding to a target language type, the target voice being a voice to be played by a video application of the electronic device or a voice sent by a terminal device to the electronic device;
determine a first language type corresponding to the first headphone;
convert the target voice into a first input voice corresponding to the first language type; and
send the first input voice to the first headphone;
determine a second language type corresponding to the second headphone;
determine the target voice as a second input voice when the second language type is the same as the target language type;
convert the target voice into the second input voice corresponding to the second language type when the second language type is different from the target language type; and
send the second input voice to the second headphone.

9. The electronic device of claim 8, wherein the instructions are further operable with the processor to:
establish a first communication link with the first headphone.

10. The electronic device of claim 8, wherein the instructions operable with the processor to determine the first language type corresponding to the first headphone are operable with processor to:
receive a first instruction for setting language type from a user; and
determine the first language type corresponding to the first headphone according to the first instruction.

11. The electronic device of claim 8, wherein the instructions operable with the processor to determine the first language type corresponding to the first headphone are operable with processor to:
receive a first output voice from the first headphone, the first output voice being obtained by a microphone of the first headphone; and
determine the first language type according to the first output voice.

12. The electronic device of claim 11, wherein the instructions operable with the processor to determine the first language type according to the first output voice are operable with processor to:
obtain a reference voice by preprocessing the first output voice;
obtain a target voice feature by performing feature extraction on the reference voice; and
determine the first language type corresponding to the target voice feature by processing the target voice feature with a predetermined language-type training model, the language-type training model being configured to obtain a probability that the target voice feature belongs to the first language type by computing the target voice feature, and the probability being used for determining whether the target voice feature belongs to the first language type.

13. The electronic device of claim 11, wherein the target voice is sent by a terminal device, and the instructions are further operable with the processor to:
convert the first output voice into a first target output voice corresponding to the target language type; and
send the first target output voice to the terminal device.

14. The electronic device of claim 8, wherein the instructions are further operable with the processor to:
establish a second communication link with the second headphone.

15. A non-transitory computer readable storage medium, configured to store computer programs for electronic data interchange, and the computer programs being operable with a computer to:
obtain a target voice corresponding to a target language type, the target voice being a voice to be played by a video application of an electronic device or a voice sent by a terminal device to the electronic device, the electronic device being connected with a wireless headphone which comprises a first headphone and a second headphone, the wireless headphone and the electronic device being in a system;
determine a first language type corresponding to the first headphone;
convert the target voice into a first input voice corresponding to the first language type;

send the first input voice to the first headphone;
determine a second language type corresponding to the second headphone;
determine the target voice as a second input voice when the second language type is the same as the target language type;
convert the target voice into the second input voice corresponding to the second language type when the second language type is different from the target language type; and
send the second input voice to the second headphone.

* * * * *